United States Patent [19]

Hong et al.

[11] Patent Number: 5,448,617
[45] Date of Patent: Sep. 5, 1995

[54] METHOD OF PROCESSING INTELLIGENT NETWORK SERVICE CALL WITH DTMF SUBSCRIBER SIGNALLING IN ELECTRONIC SWITCHING SYSTEM FOR TOLL/TANDEM

[75] Inventors: Seon M. Hong; Tae I. Kim; Hyeong H. Lee; Chung K. Lee; Go B. Choi; Young S. Kim, all of Daejeon; Yong B. Kim, Chungcheongbuk-do; Cheon S. Kim, Seoul, all of Rep. of Korea

[73] Assignees: Electronics and Telecommunications Research Institute, Daejeon; Korea Telecommunication Authority, Seoul, both of Rep. of Korea

[21] Appl. No.: 165,491

[22] Filed: Dec. 13, 1993

[30] Foreign Application Priority Data

Dec. 14, 1992 [KR] Rep. of Korea ............... 1992-24198

[51] Int. Cl.[6] .................................... H04M 3/42
[52] U.S. Cl. ............................ 379/207; 379/201; 379/112; 379/114
[58] Field of Search ............... 379/112, 114, 115, 121, 379/201, 207

[56] References Cited

U.S. PATENT DOCUMENTS

| | | | |
|---|---|---|---|
| 4,567,323 | 1/1986 | Lottes et al. | 379/201 |
| 4,763,350 | 8/1988 | Immendorfer et al. | 379/201 X |
| 4,893,330 | 1/1990 | Franco | 379/115 X |
| 5,187,710 | 2/1993 | Chau et al. | 379/115 X |
| 5,247,571 | 9/1993 | Kay et al. | 379/112 X |
| 5,327,489 | 7/1994 | Anderson et al. | 379/207 |

OTHER PUBLICATIONS

Berman et al. "Perspectives on the AIN Architecture," IEEE Communications Magazine, Feb. 1992 pp. 27–32.
Lathia, "Implementation of ISDN Wide Area Centrex in System 12", Electrical Communication vol. 63 No. 4 1989 pp. 374–382.
Batten, "Personal Communications Services and the Intelligent Network", British Telecom Engineering, vol. 9, Aug. 1990, pp. 88–91.
du Vachat et al., "Services Offered by Intelligent Networks" Electrical Communications 1989, pp. 331–336.

Primary Examiner—James L. Dwyer
Assistant Examiner—Daniel S. Hunter
Attorney, Agent, or Firm—Spencer, Frank & Schneider

[57] ABSTRACT

A method of processing an intelligent network service call in a service switching point (SSP) which has a DTMF processor and is connected to the originating local exchange/transit exchange to provide an intelligent network service. The SSP receives a digit from the other exchange in a R2MFC signalling mode to process a trunk signal from the other exchange upon generation of a trunk line seizure request from the other exchange. The SSP analyzes the received digit to check whether a call from the other exchange is a normal call or an intelligent network service call in which subscriber's information must be received in the middle of the service. If the call from the other exchange is the intelligent network service call, the SSP collects a calling number and a calling category from the other exchange, releases the R2MFC signalling mode and forms a speech path with the other exchange to communicate directly with a service user. Then, the SSP operates the DTMF processor and an announcement sending device to instruct the service user to transmit desired information and collects the desired information from the service user. Then, the SSP releases the announcement sending device and the DTMF processor and processes an out-going trunk call for routing to the terminating local exchange/transit exchange to which a called subscriber belongs.

4 Claims, 3 Drawing Sheets

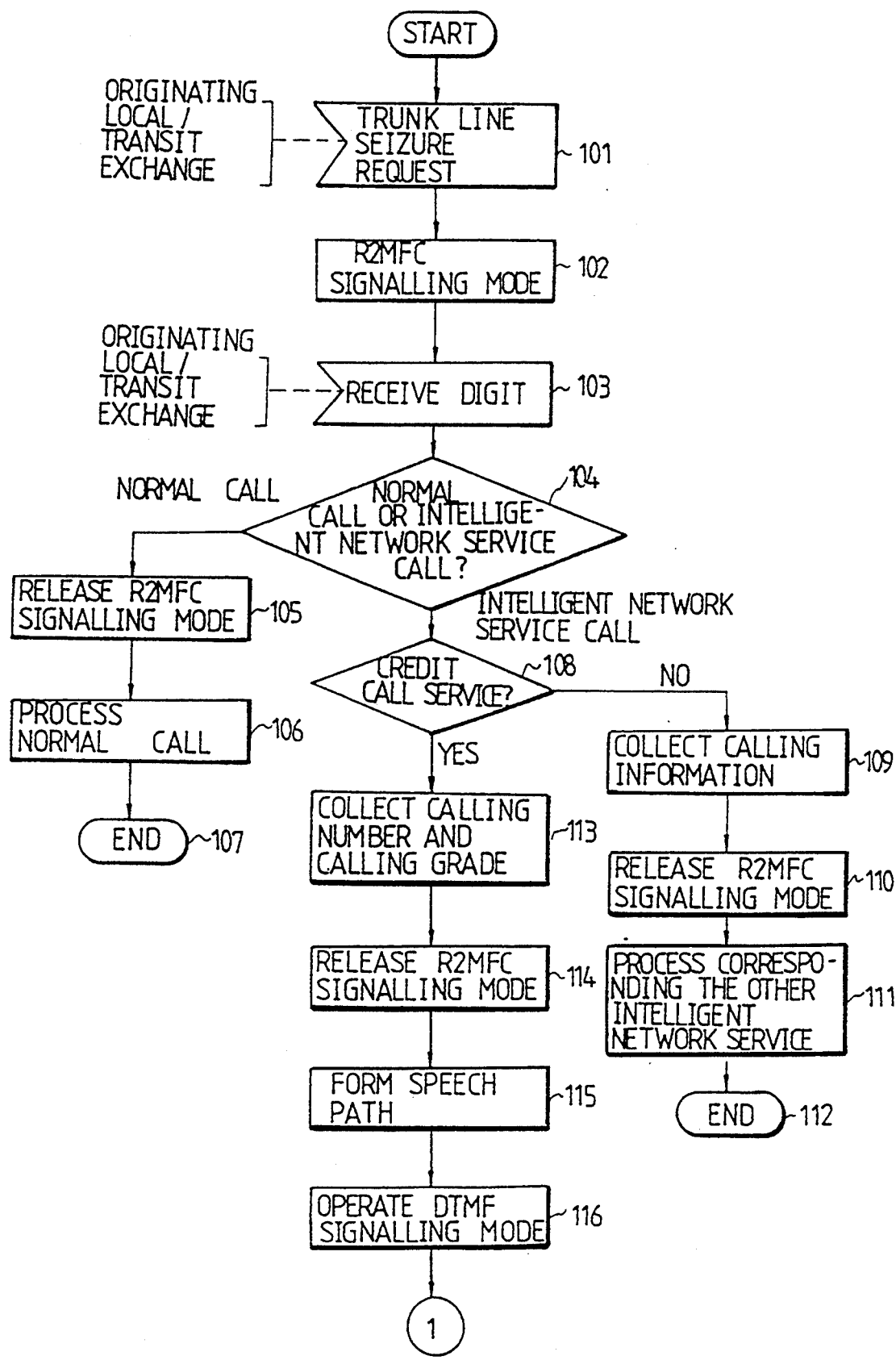

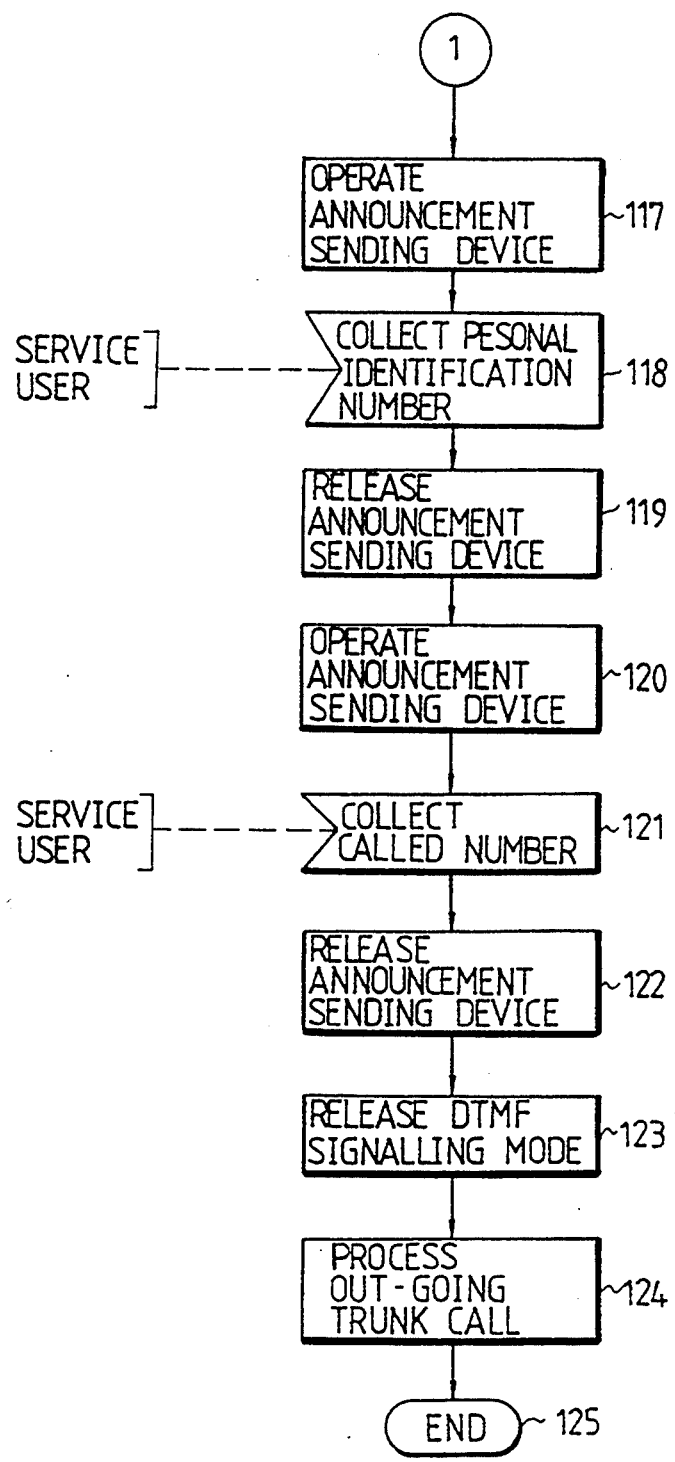

METHOD OF PROCESSING INTELLIGENT NETWORK SERVICE CALL WITH DTMF SUBSCRIBER SIGNALLING IN ELECTRONIC SWITCHING SYSTEM FOR TOLL/TANDEM

BACKGROUND OF THE INVENTION

1. Field of the Invention

The present invention relates in general to a method of processing an intelligent network service call in an electronic switching system for Toll/Tandem, and more particularly to a method of processing a call requesting an intelligent network service such as a credit call service in which subscriber's information must be received in the middle of the service.

2. Description of the Prior Art

Recently, intelligent network services have been proposed for the purpose of meeting various requirements of communication service users. In the intelligent network services, a service switching point (referred to hereinafter as SSP) is provided to act as a barrier. Namely, the SSP analyzes a call from a subscriber of a telephone network and, upon determining that the subscriber call requires any one of the intelligent network services as a result of the analysis, requests a service control point (referred to hereinafter as SCP) as a service data base to transmit call control information necessary to the process of the corresponding intelligent network service. Then, the SSP performs the intelligent network service required by the subscriber in accordance with the call control information from the SCP.

In an electronic switching system for Toll/Tandem, there are provided a variety of intelligent network services in which subscriber's information must be received in the middle of the services. The representative one of the intelligent network services is a credit call service.

In the credit call service, an agreement on a credit number and a billing number is made between the subscriber and an operator. Upon a service request from the credit number, a call charge is automatically levied on the billing number specified by the service subscriber. This credit call service is convenient because the subscriber can telephone with no cash regardless of his position, only with the confirmation of a credit state. In order to protect the subscriber from a third person knowing the credit number of the subscriber, the credit call service requires the user to transmit a personal identification number (PIN) every telephone call. In this case, the credit call service will connect the telephone call from the user to a called number required by the user through a screening process.

By the way, in the intelligent network service such as the credit call service with a complex number system and procedure for use, the information can readily be collected using only an existing subscriber signalling method or a dual tone multi-frequency (referred to hereinafter as DTMF) method in the case where the SSP is disposed in a local exchange hierarchy. But, it is not efficient to dispose the SSP in all local exchanges in an initial provision of the intelligent network service, since there is little demand initially for the intelligent network service. Therefore, in the initial provision of the intelligent network service, the SSP is not disposed in any local exchange but in a TOLL hierarchy, so that the intelligent network service can be provided for all the initial users with a variation of information regarding the TOLL and no correction of the local exchange.

However, in the case where the SSP is disposed in the TOLL hierarchy, the use of a local exchange to which the user belongs and an inter-net trunk signal (R2 multi-frequency compelled, referred to hereinafter as R2MFC) is not suitable to the collection of all necessary information. Also, this makes it impossible to let the user hear of an announcement from the transit exchange. The reason is that there is no provision of a DTMF signalling method in the existing transit exchange which enables the existing transit exchange to communicate directly with the subscriber. Noticeably, to enable the existing transit exchange to communicate directly with the subscriber, a signalling method using a loop dial pulse may be provided separately From the DTMF signalling method using the multi-frequency.

For this reason, in the case where the SSP is disposed in the TOLL hierarchy, both the inter-net trunk signalling method (R2MFC) and the subscriber signalling method must be employed to collect the information necessary to the intelligent network service.

SUMMARY OF THE INVENTION

Therefore the present invention has been made in view of the above problems, and it is an object of the present invention to provide a method of processing an intelligent network service call in an electronic switching system for Toll/Tandem in which the electronic switching system for Toll/Tandem communicates directly with a subscriber using a DTMF signalling method to process an intelligent network service required by an exchange employing a R2MFC signalling method and an intelligent network service such as a credit call service in which subscriber's information must be received in the middle of the service.

In accordance with the present invention, the above and other objects can be accomplished by a provision of a method of signalling processing an intelligent network service call in a service switching point being installed in a transit exchange, said service switching point having a DTMF processor and being connected to the other local exchanges or transit exchange to provide an intelligent network service, comprising the steps of (a) receiving a digit from the originating local/transit exchange in a R2MFC signalling mode to process a trunk signal from the originating local/transit exchange upon generation of a trunk line seizure request from the originating local/transit exchange; (b) analyzing the received digit to check whether a call from the originating local/transit exchange is a normal call or an intelligent network service call in which subscriber's information must be received in the middle of the service, collecting a calling number and a calling category from the originating local/transit exchange if it is checked that the call from the originating local/transit exchange is the intelligent network service call in which the subscriber's information must be received in the middle of the service, releasing the R2MFC signalling mode and forming a speech path with the originating local/transit exchange to communicate directly with a service user connected to the local/transit exchange; (c) operating said DTMF processor, operating an announcement sending device to instruct the service user to transmit desired information and collecting the desired information from the service user; and (d) releasing said announcement sending device and said DTMF processor upon collecting all the desired information and processing an out-going trunk call for routing to the terminating local/transit exchange to which a called subscriber belongs.

BRIEF DESCRIPTION OF THE DRAWINGS

The above and other objects, features and advantages of the present invention will be more clearly understood from the following detailed description taken in conjunction with the accompanying drawings, in which:

FIGS. 2A and 2B are a flowchart illustrating a method of processing an intelligent network service call in accordance with an embodiment of the present invention.

DETAILED DESCRIPTION OF THE PREFERRED EMBODIMENT

Figure 1:
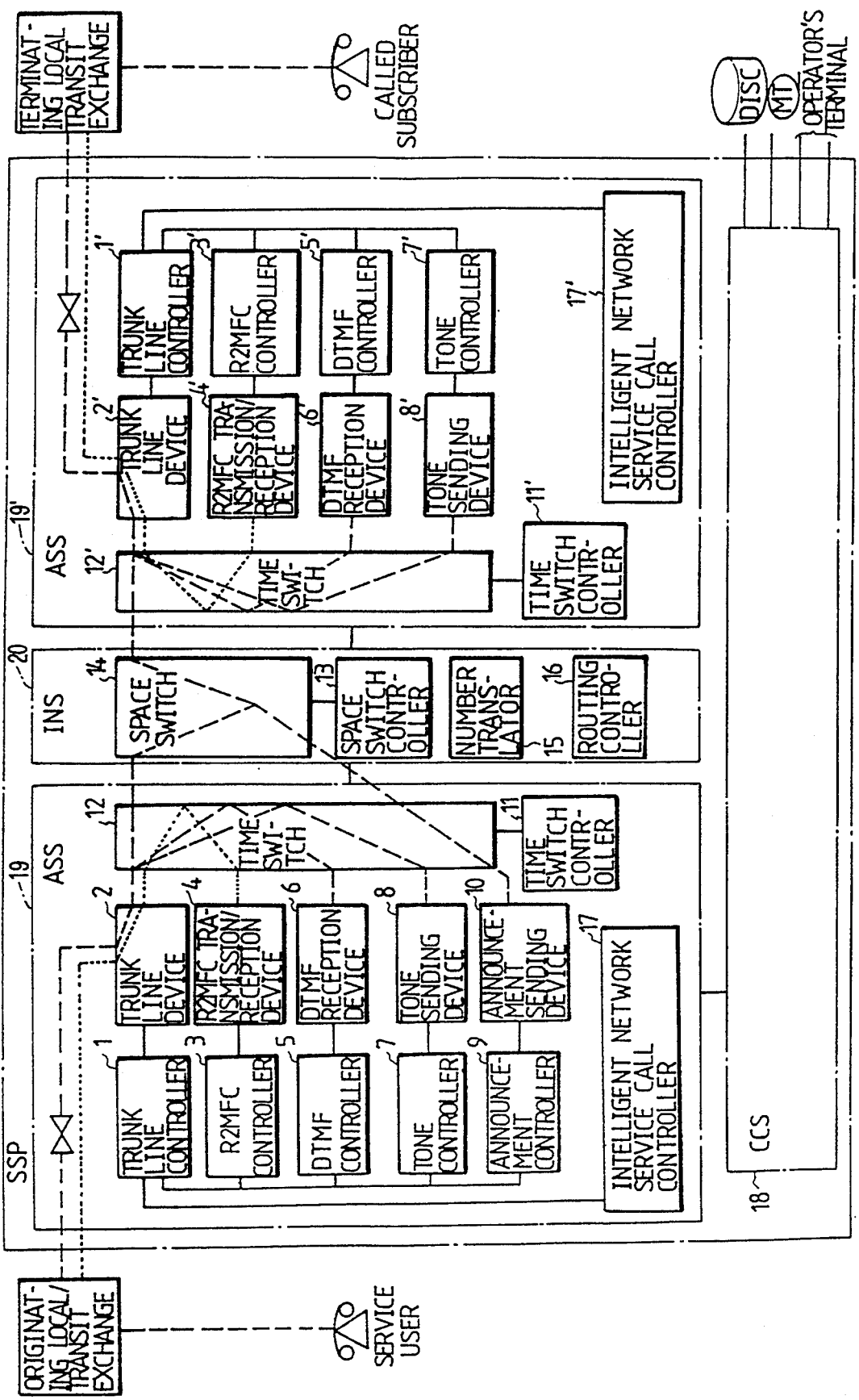
FIG. 1 is a block diagram of a SSP in TOLL hierarchy which is applied to the present invention.

Referring to FIG. 1, there is shown a block diagram of a SSP in TOLL hierarchy which is applied to the present invention. In this drawing, there is shown hardware of the SSP associated with the control of an intelligent network service call.

As shown in FIG. 1, the SSP comprises three physical subsystems, an access switching system 19 (referred to hereinafter as ASS) for performing a dispersed call processing function, an interconnection network subsystem 20 (referred to hereinafter as INS) for performing a concentrated call processing function, and a central control subsystem 18 (referred to hereinafter as CCS) for performing a central control function with respect to maintenance and administration.

The ASS 19 includes subscriber and trunk lines matching circuits, various signalling devices, a time switch and etc. to process most, of calls and perform a self-maintenance function. The ASS 19 has systematically a horizontally dispersed structure. A plurality of Ass's 19 may be disposed in the SSP system up to 60 at the maximum in number.

The INS 20 is disposed at the center of the SSP system for communication with the ASS 19 or interconnection of the ASS 19 and the CCS 18. A space switch is included in the INS 20. Also, the INS 20 performs number translation, routing, space switch connection and etc. in the call processing function. The INS 20 also includes a network synchronization device to generate a system clock.

The CCS 18 is a subsystem for operating and managing the SSP system in the gross. The CCS 18 performs test, maintenance, measurement, statistics, call charge levy and etc. with respect to the whole of the SSP system. Also, the CCS 18 controls a hard disc and a magnetic tape (MT) as auxiliary storage units. Further, the CCS 20 performs an operator matching function.

In detail, the ASS 19, 19' includes trunk line devices 2 and 2', R2MFC transmission/reception devices 4 and 4', DTMF reception devices 6 and 6', tone sending devices 8 and 8', an announcement sending device 10 (ASS 19) and time switches 12 and 12'. Also, the ASS 19, 19' includes trunk line controllers 1 and 1' for matching with intelligent network service call controllers 17 and 17', R2MFC controllers 3 and 3' for controlling the R2MFC transmission/reception devices 4 and 4' by the control of the trunk line controllers 1 and 1', DTMF controllers 5 and 5' for controlling the DTMF reception devices 6 and 6' by the control of the trunk line controllers 1 and 1', tone controllers 7 and 7' for controlling the tone sending devices 8 and 8' by the control of the trunk line controllers 1 and 1', an announcement controller 9 (ASS 19) for controlling the announcement sending device 10 by the control of the trunk line controller 1, and time switch controllers 11 and 11' for controlling the time switches 12 and 12'.

The INS 20 includes a space switch 14 and a space switch controller 13 for controlling the space switch 14.

In the SSP, upon transmission of an intelligent network service call from the originating local/transit exchange to the trunk line device 2, the R2MFC transmission/reception device 4 transmits and receives desired information to/from the other exchange over a trunk line via the time switch 12 using the R2MFC signalling method.

Upon completion of the transmission and reception of the inter-net trunk signal between the SSP and the originating local/transit exchange, a speech path is formed between the SSP and the user requesting the intelligent network service through the originating local/transit exchange, to allow the user to transmit a digit. Then, the announcement from the announcement sending device 10 is sent by the control of the announcement controller 9 to the user connected to the speech path through the time switch 12 and the space switch 14 by the control of the space switch controller 13.

The digit from the, user is passed over the speech path through the subscriber and trunk lines and then received by the DTMF reception device 6 through the time switch 12.

In the case where the announcement is to be sent in the middle of processing the intelligent network service call, the space switch 14 is connected to the announcement sending device 10 by the control of the space switch controller 13. The SSP announcement is recorded in the announcement sending device 10 and is sent therefrom to the user by the control of the announcement controller 9 to help the user in his information input. Then, the DTMF reception device 6, the announcement sending device 10 and various resources are released.

With all the information inputted, the intelligent, network service call controller 17 receives the corresponding information and performs the process necessary to the call control in accordance with the received information. Upon receiving a routing number from the intelligent network service call controller 17, the trunk line controller 1 requests a number translator 15 in the INS 20 to translate the routing number. Then, the trunk line controller 1 transfers the translation result from the number translator 15 to the intelligent network service call controller 17.

For routing to the terminating local/transit exchange to which the received called number belongs, a routing operation of a routing controller 16 in the INS 20 is required by the SSP. Then, the R2MFC transmission/reception device 4' transmits and receives desired information to/from the terminating local/transit exchange via the time switch 12' using the R2MFC signalling method. Upon completion of the transmission and reception of the inter-net trunk signal between the SSP and the terminating local/transit exchange, a speech path is formed between the SSP and a called subscriber through the space switch 14, the time switch 12' and a trunk line to allow the user to telephone conversation with the called subscriber.

In FIG. 1, a solid line '—' is a control signal line, a dashed line '------' is the speech path and a dotted line '······' is a signal processing line.

FIGS. 2A and 2B are a flowchart illustrating a method of processing an intelligent network service call in accordance with an embodiment of the present invention. In this drawing, the SSP in the credit call service of the intelligent network services is shown to collect the service user's information from an electronic telephone set using the DTMF signalling method and communicate with the service user in accordance with the collected information.

Upon generation of a trunk line seizure request from the originating local/transit exchange at the step 101, the SSP receives a digit from the originating local/transit exchange at the 103 using the R2MFC signalling method at the step 102 to process a trunk signal from the originating local/transit exchange.

The SSP analyzes the received digit to check whether a call from the originating local/transit exchange is a normal call or the intelligent network service call at the step 104. If it is checked at the step 104 that the received call from the originating local/transit exchange is the normal call, the SSP releases the R2MFC transmission/reception device at the step 105, performs the normal call process at the step 106 and then completes the operation at the step 107.

On the contrary, if it is checked at the step 104 that the received call from the originating local/transit exchange is the intelligent network service call, the SSP checks using a service identifier at the step 108 whether the intelligent network service call is the credit call service call.

If it is checked at the step 108 that the intelligent network service call is not the credit call service call but a different intelligent network service call, the SSP collects call information necessary to the process of the corresponding intelligent network service call at the step 109 and releases the R2MFC transmission/reception device at the step 110. Then, the SSP performs the process of the corresponding intelligent network service call at the step 111 and then completes the operation at the step 112.

On the other hand, if it is checked at the step 108 that the intelligent network service call is the credit call service call, the SSP collects a calling number and a calling category from the originating local/transit exchange at the step 113 and releases the R2MFC transmission/reception device at the step 114. At the step 115, the SSP forms a speech path with the originating local/transit exchange to which the user requesting the credit call service belongs, to communicate directly with the service requesting user, so as to collect desired information from the user.

Then, the SSP operates the DTMF reception device at the step 116 and operates the announcement, sending device at the step 117 to instruct the; service user to transmit a personal identification number. Upon collecting the personal identification number from he service user at the step 118, the SSP releases the announcement, sending device at the step 119.

Also, the SSP operates the announcement sending device at the step 120 to instruct the service user to transmit a called number. Upon collecting the called number from the service user at the step 121, the SSP releases the announcement sending device at the step 122.

With all the information collected, the SSP releases the DTMF reception device at the step 123 and processes an outgoing trunk call for routing to the terminating local/transit exchange at the step 124 to connect to a called subscriber, so as to perform the credit call service. Then, the SSP completes the credit call at step 125 service call.

As apparent from the above description, according to the present invention, the DTMF signalling method processing hardware is provided in the transit exchange providing the intelligent network service, to communicate directly with the subscriber, With the DTMF signalling method processing hardware provided, the transit exchange can provide the intelligent network service such as the credit call service in which the information from the subscriber must be received in the middle of the service.

Also, the intelligent network SSP may be varied to provide the intelligent network service with no variation of a software of the local/transit exchange. Namely, the intelligent network service can be provided with no large modification of the general exchange. This has the effect of making an early use of the intelligent network service possible with the low cost.

In other words, according to the present invention, the intelligent network SSP is provided by merely varying a part of the software of the existing transit exchange and adding the DTMF signalling method processing hardware to the existing transit exchange, with no large modification of the existing transit exchange. Also, the local/transit exchange can support the intelligent network service by merely altering only the routing information, with no variation of the hardware and software thereof. Further, in order to provide the intelligent network service equally for all the subscribers, signal links must be provided between all the other exchanges and the SCP as the data base for communication therebetween. In this case, the intelligent network service can equally be provided for all the subscribers only with a ink between the SSP and the SCP.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of processing an intelligent network service call in a service switching point installed in a transit exchange, said service switching point having a DTMF processor and being connected to local exchanges or another transit exchange to provide an intelligent network service, comprising the steps of:
   (a) receiving a digit from an originating local/transit exchange in a R2 multi-frequency compelled signalling mode to process a trunk signal from the originating local/transit exchange upon generating of a trunk line seizure request from the originating local/transit exchange;
   (b) analyzing the received digit to check whether a call from the originating local/transit exchange is a normal call or an intelligent network service call in which subscriber information must be received in the middle of the service, collecting a calling number and a calling category from the originating local/transit exchange if the call from the originating local/transit exchange is the intelligent network service call in which the subscriber information must be received in the middle of the service, releasing the R2 multi-frequency compelled signalling mode and forming a speech path with the originating local/transit exchange to communicate directly with a service user connected to the originating local/transit exchange;

(c) operating said DTMF processor and operating an announcement sending device to instruct the service user to transmit desired information and collecting the desired information from the service user with said DTMF processor; and (d) releasing said announcement sending device and said DTMF processor upon collecting all the desired information and processing an out-going trunk call for routing to a terminating local/transit exchange to which a called subscriber belongs.

2. A method of processing an intelligent network service call in a service switching point, as set forth in claim 1, wherein said step (b) includes the step of:

collecting calling information if the call from the originating local/transit exchange is a different intelligent network service call other than the intelligent network service call in which the subscriber information must be received in the middle of the service, releasing the R2 multi-frequency compelled signalling mode and performing the process of the corresponding intelligent network service call.

3. A method of processing an intelligent network service call in a service switching point, as set forth in claim 1, wherein said step (b) includes the step of:

releasing the R2 multi-frequency compelled signalling mode if the call from the originating local/transit exchange is the normal call and performing the normal call process.

4. A method of processing an intelligent network service call in a service switching point, as set forth in claim 1, wherein the desired information at said step (c) includes a billing number, a personal identification number and a called number.

* * * * *